United States Patent
Alvi et al.

(10) Patent No.: US 11,850,950 B2
(45) Date of Patent: Dec. 26, 2023

(54) HIGH VOLTAGE POWERED SOLID STATE FUSE WITH BATTERY POWER CONTROL

(71) Applicant: GM GLOBAL TECHNOLOGY OPERATIONS LLC, Detroit, MI (US)

(72) Inventors: Muhammad Hussain Alvi, Troy, MI (US); Chandra S. Namuduri, Troy, MI (US); Renato Amorim Torres, Madison, WI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 38 days.

(21) Appl. No.: 17/578,950

(22) Filed: Jan. 19, 2022

(65) Prior Publication Data

US 2023/0226915 A1 Jul. 20, 2023

(51) Int. Cl.
*B60L 3/00* (2019.01)
*H02J 7/00* (2006.01)
*H02M 7/537* (2006.01)

(52) U.S. Cl.
CPC .......... *B60L 3/0046* (2013.01); *H02J 7/0031* (2013.01); *H02J 7/00712* (2020.01); *H02M 7/537* (2013.01); *B60L 2210/10* (2013.01)

(58) Field of Classification Search
CPC ................ B60L 3/0046; B60L 2210/10; H02J 7/00712; H02J 7/0031; H02M 7/537
See application file for complete search history.

(56) References Cited

U.S. PATENT DOCUMENTS

| | | | | |
|---|---|---|---|---|
| 2014/0153150 | A1* | 6/2014 | LePort | B60L 3/0046 361/93.1 |
| 2020/0052509 | A1* | 2/2020 | Fan | H01R 31/08 |
| 2020/0204062 | A1* | 6/2020 | Ikeda | H02M 1/44 |
| 2022/0328270 | A1* | 10/2022 | Namuduri | H02H 7/122 |

OTHER PUBLICATIONS

U.S. Appl. No. 17/224,736, filed Apr. 7, 2021, Namuduri et al.
U.S. Appl. No. 17/467,913, filed Sep. 7, 2021, Namuduri et al.

* cited by examiner

*Primary Examiner* — Jared Fureman
*Assistant Examiner* — Duc M Pham

(57) ABSTRACT

A power control system includes a power inverter comprising a first side, a second side, and a plurality of power switches. The second side is configured to connect to an electric machine. A solid state fuse includes a power switch including a first terminal in communication with the first terminal of a rechargeable energy storage system (RESS) of the electric vehicle and a second terminal in communication with the first side of the power inverter. A DC-DC converter is configured to convert a first voltage output by the RESS of the electric vehicle to a second voltage. One or more sensors configured to sense one or more operating parameters of the RESS. A fuse controller is configured to receive power from the DC-DC converter, to communicate with the one or more sensors and to cause the power switch to selectively change state in response to changes in the one or more operating parameters.

20 Claims, 9 Drawing Sheets

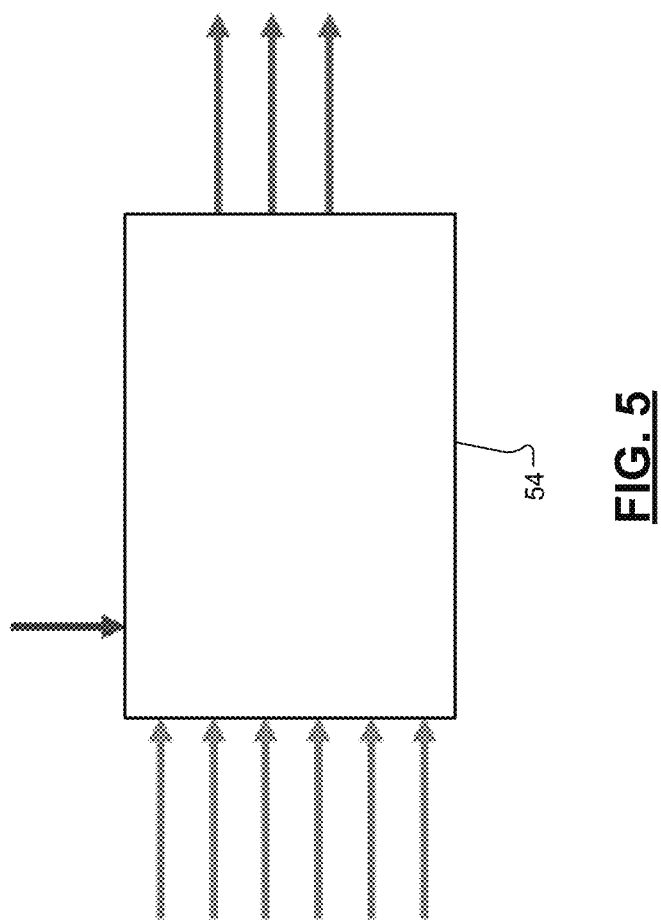

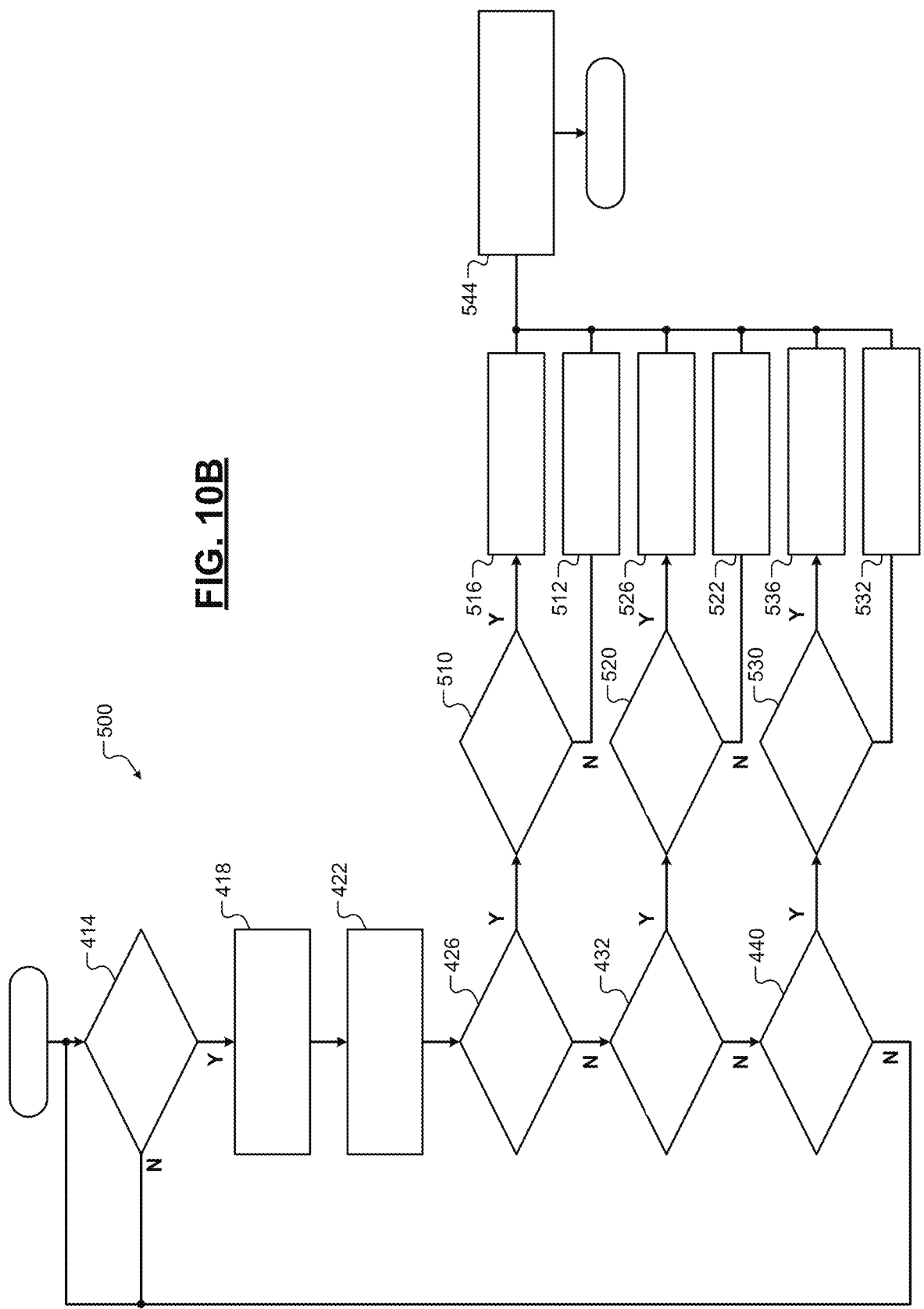

HIGH VOLTAGE POWERED SOLID STATE FUSE WITH BATTERY POWER CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to power control systems of electric vehicles, and more particularly to power control systems including a solid state fuse.

Electric vehicles (EVs) such as hybrid vehicles, battery electric vehicles (BEVs) and/or fuel cell vehicles include a rechargeable energy storage system (RESS) and one or more electric machines. The RESS includes one or more battery cells that can be connected in series, parallel and/or combinations thereof. The battery cells can be arranged in battery modules and/or the battery modules can be arranged in battery packs. A power control system is used to control charging and/or discharging of the RESS.

While driving, the one or more electric machines are operated as a motor and receive power from the RESS to provide propulsion for the vehicle. The one or more electric machines are also operated as a generator during braking to return power to the RESS.

The power control system includes one or more fuses to handle various fault conditions (such as current surges) to protect electronic components of the power control system and the RESS. When a high current fault occurs, the fuse blows to break an electrical connection between the RESS and vehicle loads. The vehicle cannot be driven after the fuse is blown until the fuse is replaced.

SUMMARY

A power control system for an electric vehicle includes a power inverter comprising a first side, a second side, and a plurality of power switches, wherein the second side is configured to connect to an electric machine. A solid state fuse includes a power switch including a first terminal in communication with the first terminal of a rechargeable energy storage system (RESS) of the electric vehicle and a second terminal in communication with the first side of the power inverter. A DC-DC converter is configured to convert a first voltage output by the RESS of the electric vehicle to a second voltage. One or more sensors configured to sense one or more operating parameters of the RESS. A fuse controller is configured to receive power from the DC-DC converter, to communicate with the one or more sensors and to cause the power switch to selectively change state in response to changes in the one or more operating parameters.

In other features, the DC-DC converter comprises an isolated DC-DC converter. The one or more sensors comprises a voltage sensor configured to sense voltage output by the RESS. The fuse controller calculates voltage ripple based on the sensed voltage, compares the voltage ripple to a predetermined voltage ripple threshold and selectively opens the power switch when the voltage ripple is greater than the predetermined voltage ripple threshold.

In other features, the one or more sensors comprises a current sensor configured to sense current output by the RESS. The fuse controller compares the sensed current to a predetermined current threshold and selectively opens the power switch when the sensed current is greater than the predetermined current threshold.

In other features, the one or more sensors comprises a current sensor configured to sense current output by the RESS. The fuse controller calculates current ripple based on the sensed current, compares the current ripple to a predetermined current ripple threshold and selectively opens the power switch when the current ripple is greater than the predetermined current ripple threshold.

In other features, the solid state fuse further comprises a gate driver configured to communicate with the DC-DC converter and the fuse controller and to selectively output a control signal to a control terminal of the power switch. The solid state fuse further comprises an isolator configured to provide isolation between the fuse controller and a vehicle data bus and to receive data from and send data to the vehicle data bus.

In other features, the fuse controller is configured to cause a pulse width modulated signal to be output to the power switch in response to a fault. The fuse controller is configured to communicate with the one or more sensors; detect a first type of faults and a second type of faults; cause the power switch to selectively open in response to the first type of faults; and cause a pulse width modulated (PWM) signal to be output to the power switch in response to the second type of faults. A snubber circuit is connected in parallel to the power switch.

A power control system for an electric vehicle includes a power inverter comprising a first side, a second side, and a plurality of power switches. The second side is configured to connect an electric machine. A solid state fuse includes a power switch including a first terminal in communication with a first terminal of a rechargeable energy storage system (RESS) of the electric vehicle and a second terminal in communication with the first side of the power inverter. One or more sensors are configured to sense one or more operating parameters of the RESS. A fuse controller is configured to communicate with the one or more sensors; detect a first type of faults and a second type of faults; cause the power switch to selectively open in response to detecting the first type of faults based on the one or more operating parameters; and cause output of a pulse width modulated (PWM) signal to the power switch in response to detecting the second type of faults.

In other features, a DC-DC converter is configured to convert a first voltage output by the RESS to a second voltage, wherein the fuse controller is powered by the second voltage. The one or more sensors comprise a voltage sensor configured to sense voltage output by the RESS. The fuse controller is configured to calculate voltage ripple based on the sensed voltage; compare the voltage ripple to a predetermined voltage ripple threshold; and selectively declare one of the first type of faults and the second type of faults in response to the comparison.

In other features, the one or more sensors comprises a current sensor configured to sense current output by the RESS. The fuse controller is configured to compare the current to a predetermined current threshold and selectively declare one of the first type of faults and the second type of faults in response to the comparison.

In other features, the one or more sensors comprises a current sensor configured to sense current output by the RESS. The fuse controller is configured to calculate current ripple based on the sensed current; compare the current ripple to a predetermined current ripple threshold; and selectively declare one of the first type of faults and the second type of faults in response to the comparison.

In other features, the solid state fuse further comprises a gate driver configured to communicate with the DC-DC converter and the fuse controller and to selectively output a control signal to a control terminal of the power switch. The solid state fuse further comprises an isolator configured to provide isolation between the fuse controller and a vehicle data bus and to receive data from and send data to the vehicle data bus.

In other features, the solid state fuse further comprises a snubber circuit connected in parallel to the power switch.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a functional block diagram of an example of signals received and output by a fuse controller according to the present disclosure;

FIGS. 10A and 10B are examples of flowcharts for operating the solid state fuse according to the present disclosure.

In the drawings, reference numbers may be reused to identify similar and/or identical elements.

DETAILED DESCRIPTION

Figure 2:
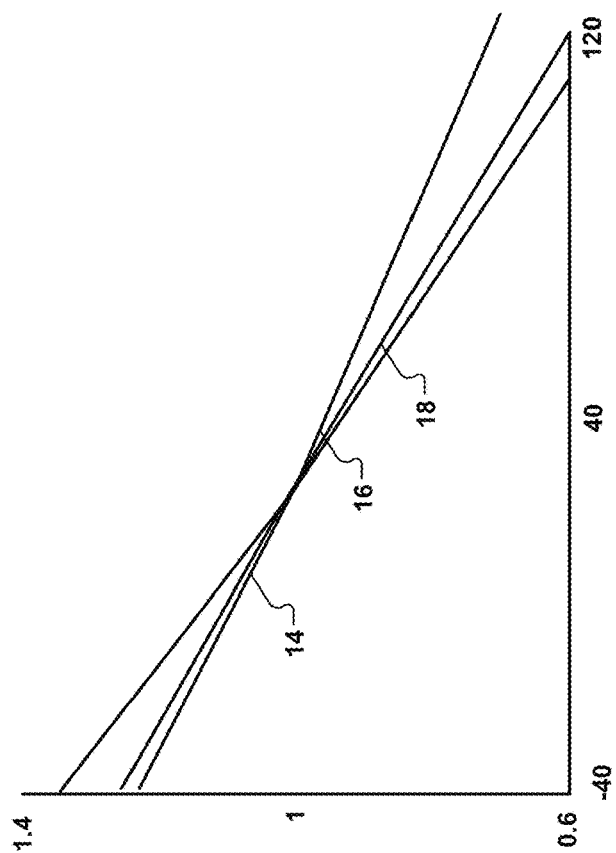
FIG. 2 is a graph illustrating an example of melting time correction as a function of ambient temperature.

Faults occur during operation of an electric vehicle including a rechargeable energy storage system (RESS) for various reasons. For example, high current faults may incur due to leakage currents, failure of a power switch in an ON or OFF state, lack of isolation (fraying insulation in the electric machine), shorted windings, bearing currents and/or other reasons. When current spikes occur during a fault, the current spike blows a conductor of a fuse. The fuse relies on melting of the conductor connected between two terminals (in series with the load current) due to high energy resulting from the current surge.

Melting time refers to the time required to melt the conductor of the fuse. Clearing time refers to a period including the melting time and additional time required to extinguish a fault arc caused by the fault. Fuses typically have variable response times in a range from 5 milliseconds to hundreds of milliseconds. Operating conditions such as current levels, ambient temperature and/or voltage levels may affect the reliability of the fuse and the variability of the response time.

Fuses need to be replaced after melting since the conductor, which provides a required circuit connection, melts when the fuse blows. Fuses can also be physically large due to materials that are required to absorb built-up energy and extinguish the fault arc. In contrast, faster response time (e.g. detection of faulty conditions) can prevent catastrophic failure. However, faster response times generally require of smaller fuses.

A power control system according to the present disclosure includes a solid state fuse. In some examples, the solid state fuse taps power from a rechargeable energy storage system (RESS) to power a fuse controller and other electrical components of the solid state fuse. Using the RESS as a power source eliminates a point of failure (loss of supply power to the solid state fuse). If the RESS is unable to supply power, the solid state fuse does not need to operate. In other examples, the solid state fuse is powered by another vehicle power source. In some examples, an isolated DC-DC converter is used to convert the high voltage (HV) output of the RESS to a lower voltage level suitable for powering the solid state fuse.

During operation, the power control system records one or more measured or calculated operating parameters in one or more moving data windows that are written over after a predetermined rewrite period (to conserve storage). When a fault occurs, the controller continues to store the one or more operating parameters for a predetermined period after detection of the fault. Then, the controller moves the stored data (during a period starting before and ending after the fault) to another memory location that is not overwritten. In some examples, operating parameters that are recorded include current, voltage and/or other data so that service technicians can review the data to diagnose the fault. In some examples, calculated parameters based on measured parameters are calculated and stored.

Additionally, the power control system including the solid state fuse is configured to receive externally-generated triggers from a vehicle data bus to initiate data recording. In some examples, the externally-generated triggers may include air-bag deployment signals that are used to trigger data recording for active safety.

In some examples, the power control system including the solid state fuse monitors current and voltage and calculates current ripple and/or voltage ripple. The current, voltage, current ripple and/or voltage ripple are each compared to one or more predetermined thresholds. The power control system selectively opens the power switch in the solid state fuse based on the comparison.

The solid state fuse according to the present disclosure is configured to handle the faults in ways other than simply opening the power switch. For example, the power control system can selectively enable pulse width modulation (PWM) of the power switch (to supply power from the RESS at lower levels) after a fault is detected to provide a limp home mode. In some examples, the PWM mode is started immediately in response to the detected fault or the power switch SW is opened in response to a fault and transitioned to PWM thereafter.

Figure 1:
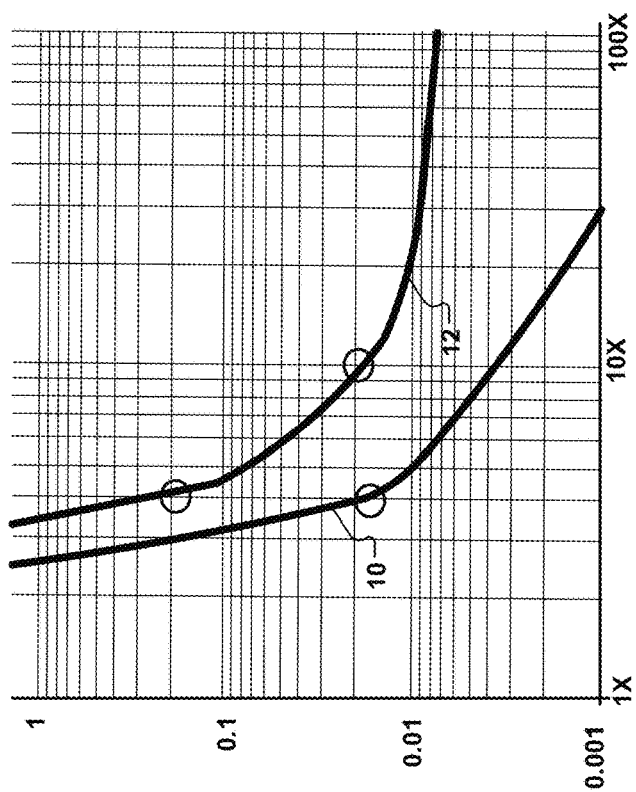
FIG. 1 is a graph illustrating an example of melting time and clearing time for a fuse.

Referring now to FIGS. 1 and 2, variability of response times of fuses are shown. In FIG. 1, melting time 10 and clearing time 12 are shown for a 500 Vdc, 100 A fuse. At 10 times rated current, the fuse takes about 20 ms to clear. At 4 times rated current, clearing time can take about 10 times the melting time. In FIG. 2, clearing time can double depending upon temperature. The variability of the response times can lead to further complications.

Figure 3:
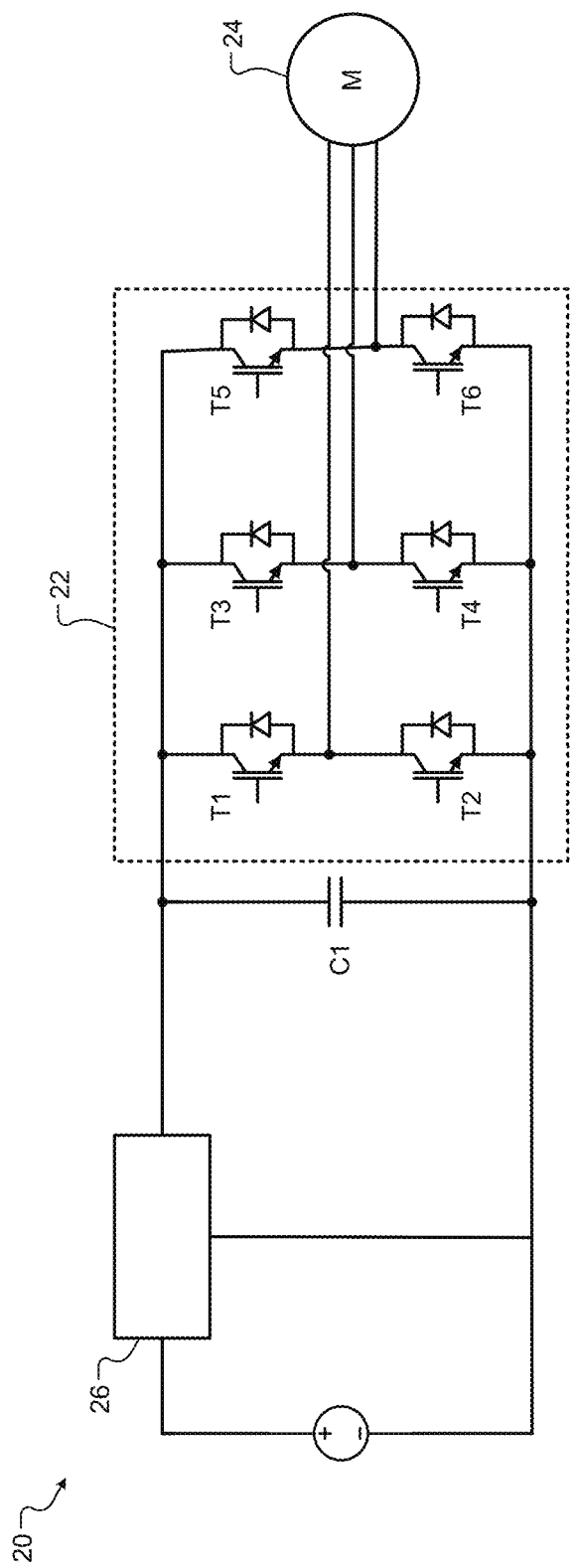
FIG. 3 is a functional block diagram and electrical schematic of an example of a power control system for a rechargeable energy storage system (RESS) including a solid state fuse according to the present disclosure.

Referring now to FIG. 3, a power control system 20 for supplying power from a rechargeable energy storage system (RESS) to a load such as an electric machine is shown. The power control system 20 includes a solid state fuse 26 rather than a conventional fuse. The solid state fuse 26 provides predictable response times that are not dependent or significantly less dependent upon current levels or temperature.

The solid state fuse 26 includes a first terminal connected to a first terminal of the RESS, a second terminal connected to a second terminal of the RESS and a third terminal connected to a first terminal of a capacitor C1 and to one side of a power inverter 22. The power inverter 22 outputs three-phase power to an electric machine 24.

The power inverter 22 includes power switches T1, T2, T3, T4, T5 and T6. First terminals of power switches T1, T3 and T5 are connected to a first terminal of the capacitor C1. Second terminals of the power switches T1, T3 and T5 are connected to first, second and third phases of a motor 14, respectively, and to first terminals of the power switches T2, T4 and T6, respectively. Second terminals of the power switches T2, T4 and T6 are connected to a second terminal of the capacitor C1.

The RESS includes one or more battery cells that can be connected in series, parallel, and/or combinations thereof and/or arranged one or more battery modules and/or battery packs. The battery modules and/or packs can also be connected in series and/or parallel. Power is supplied by the RESS via the solid state fuse 26 to the capacitor C1 and the power inverter 22.

Figure 4:
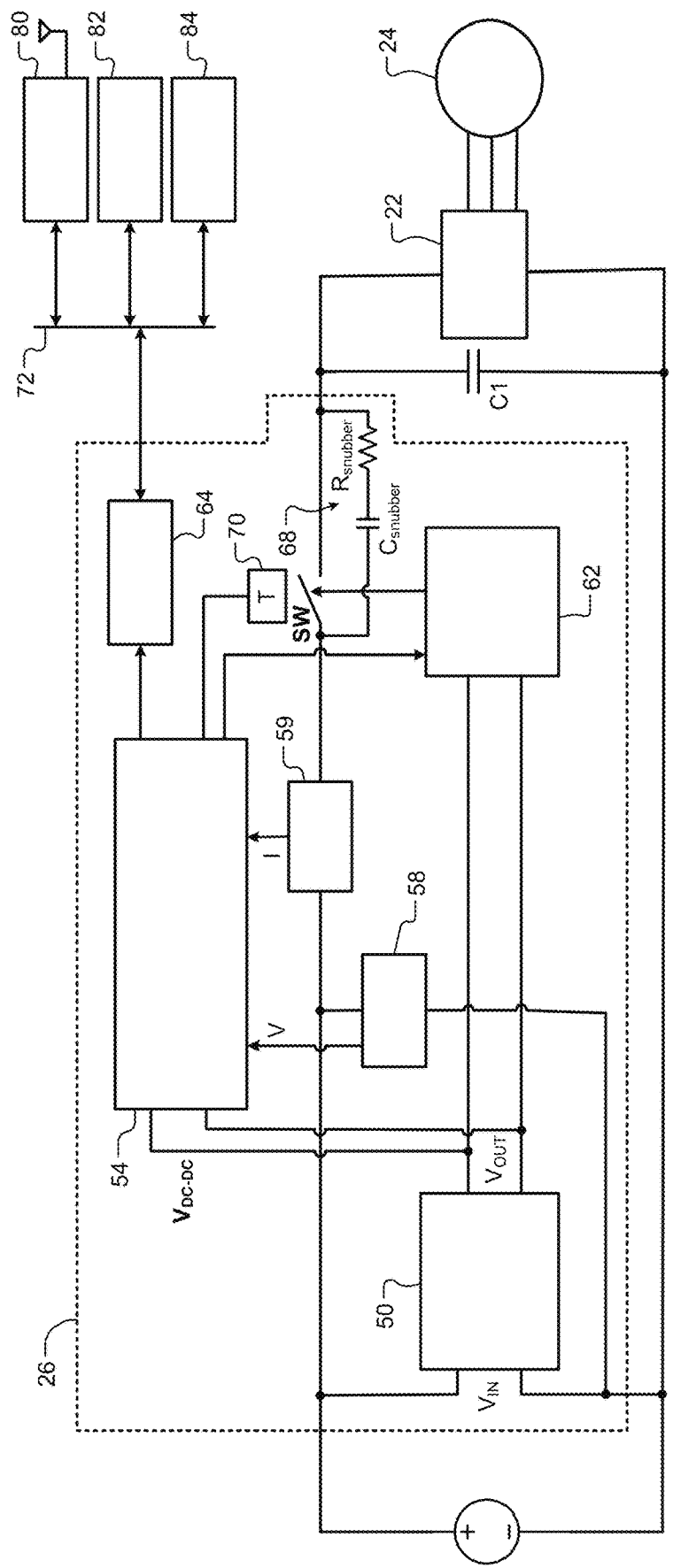
FIG. 4 is a more detailed functional block diagram and electrical schematic of an example of a solid state fuse according to the present disclosure.

Referring now to FIG. 4, the solid state fuse 26 is shown in further detail. The solid state fuse 26 includes a DC-DC converter 50 including first and second terminals (at an input side) connected to the first and second terminals of the RESS. In some examples, the DC-DC converter 50 is an isolated DC-DC converter that isolates the HV battery system from a voltage bus of the solid state fuse 26. For example, the isolated DC-DC converter may include a transformer or other type of isolation circuit.

Third and fourth terminals (at an output side) of the DC-DC converter 50 are connected to a fuse controller 54 and a gate driver 62. A voltage sensor 58 is connected to the first and second terminals of the RESS. The voltage sensor 58 senses the voltage of the RESS and outputs the sensed voltage V to the fuse controller 54. A current sensor 59 is configured to sense current supplied to the power inverter 22 and outputs the sensed current I to the fuse controller 54. The fuse controller 54 selectively outputs a gate control signal G to the gate driver 62, which controls switching of a power switch SW between ON and OFF states. The power switch SW can be a MOSFET, a bipolar junction transistor or other type of power transistor.

In some examples, an isolator circuit 64 is configured to provide isolation between the solid state fuse 26 and a vehicle data bus 72 and to receive data from and send data to a vehicle data bus 72. In some examples, a telematics controller 80, a propulsion controller 82 and/or other vehicle controller 84 can communicate with the fuse controller 54 via the vehicle data bus 72. For example, one or more predetermined thresholds of the fuse controller 54 can be programed wirelessly over the air or diagnostic data, recorded data or calculated data can be sent in response to the fault. For example, the fuse controller 54 can receive updated limits via the telematics controller 80.

In some examples, a snubber circuit 68 is used to facilitate opening of the power switch SW at high load current. In some examples, the snubber circuit 68 includes a capacitor $C_{snubber}$ connected in series with a resistor $R_{snubber}$. A first terminal of the capacitor $C_{snubber}$ is connected to a first terminal of a switch SW. A second terminal of the capacitor $C_{snubber}$ is connected to a first terminal of the resistor $R_{snubber}$. A second terminal of the resistor $R_{snubber}$ is connected to a second terminal of the resistor $R_{snubber}$. A temperature sensor 70 senses a temperature T of a junction the power switch SW or other electrical component of the solid state fuse 26.

Referring now to FIG. 5, the fuse controller 54 receives one or more input signals and outputs one or more output signals. The input signals may include one or more of the following: an airbag detection pulse, the voltage signal V, the current signal I, a power switch junction temperature, a reset/acknowledgement signal and a CAN/SPI communication input. Programmable input signals may include set points such as overcurrent values or thresholds, overvoltage values or thresholds, an under-voltage values or thresholds, one or more current thresholds, one or more current ripple thresholds, one or more voltage ripple thresholds, and/or a soft-starting profile. The output signals may include one or more of the following: power switch control signals or PWM control signals, fault detection, and/or CAN and SPI communication (capacitance value estimation, ripple and measured power).

In some examples, the DC-DC converter 50 converts an input voltage level of the RFSS such as 200V, 400V, 800V, or another high voltage level to an isolated, lower voltage level such as 5V, 12V, 20V or another suitable voltage value. Using isolated flyback topology, an efficiency of approximately 80% can be achieved at 250 mA. The output voltage of the DC-DC converter 50 powers the solid state fuse 26.

Figure 7:
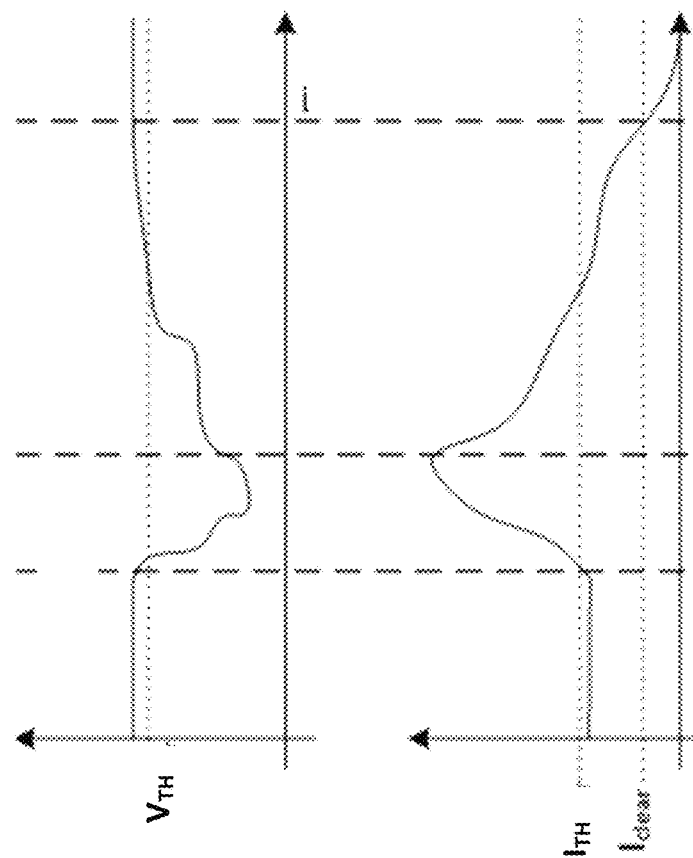
FIGS. 6 and 7 are graphs illustrating voltage and current output by the RESS as a function of time according to the present disclosure.
Figure 6:
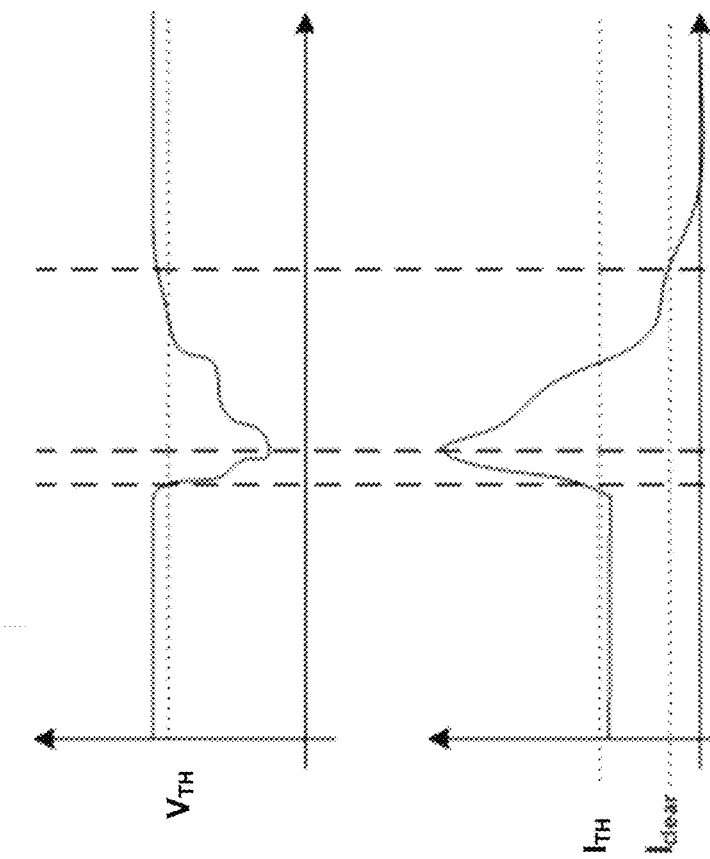

Referring now to FIGS. 6 and 7, examples of sensed voltage and current values are shown during a fault. In some examples, a fault occurs when the sensed current exceeds a predetermined current threshold $I_{TH}$ and ends when the current falls below a second predetermined current threshold $I_{clear}$. In some examples, a fault occurs when the voltage falls below a predetermined voltage threshold $V_{TH}$ and ends when the voltage rises above a second predetermined current threshold $I_{clear}$. As can be appreciated, faults can be declared for other events such as current ripple, voltage ripple, etc.

Figure 8:
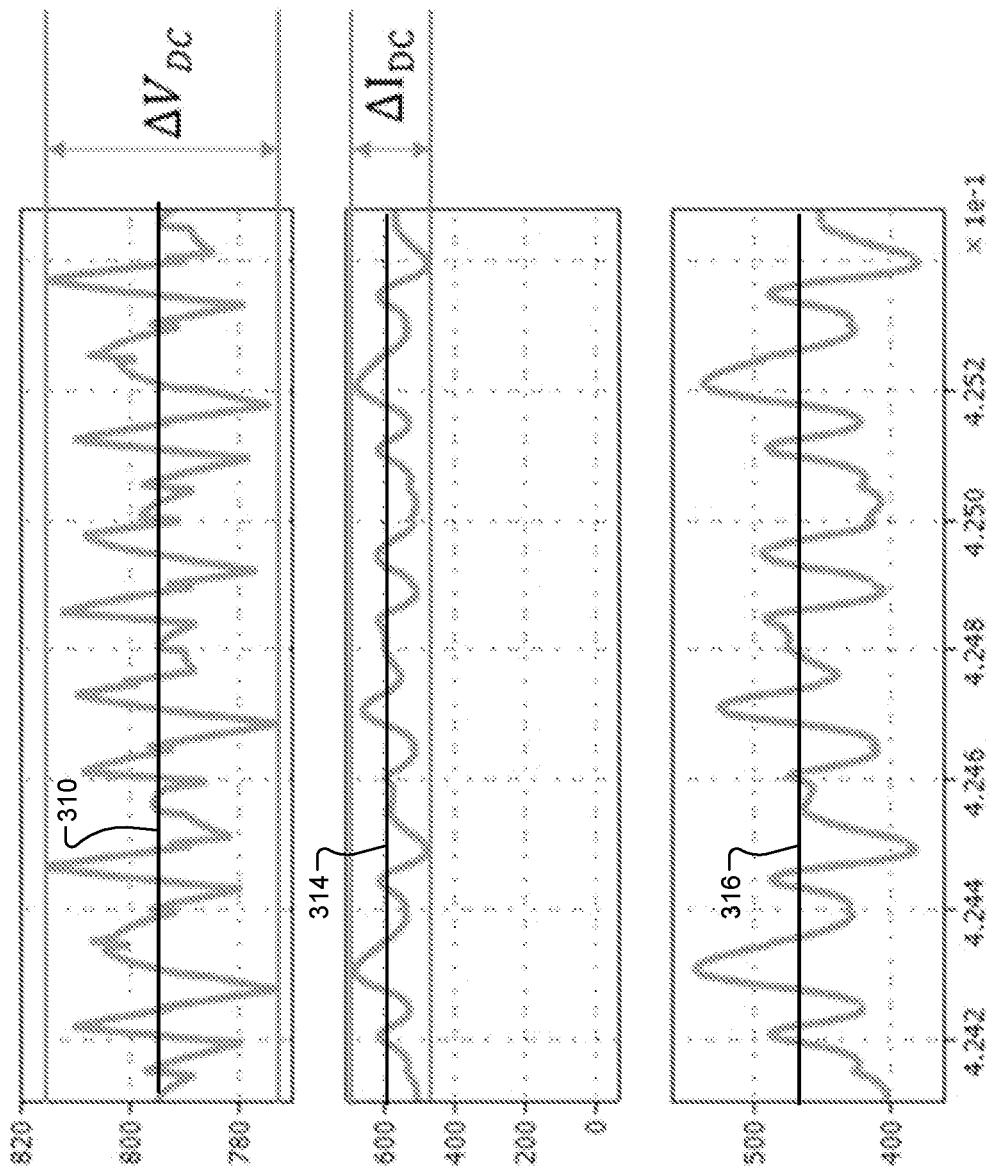
FIG. 8 include graphs illustrating an example of current, voltage and power during operation.

Referring now to FIG. 8, the measured voltage, current and power are shown. Variations in voltage, current and/or power are determined relative to expected voltage 310 (a nominal voltage of the RESS), expected current 312 (such as an expected load current) and expected power 316 (the product of expected voltage and current). Fuse controller 54 calculates voltage ripple, current ripple and/or power ripple. The voltage ripple, current ripple and/or power ripple are compared to one or more predetermined voltage, current or power ripple thresholds. For example, when the current ripple is greater than a first predetermined current ripple threshold (such as 15%) but less than a second predetermined current ripple threshold (such as 20%), the fuse controller 54 in the solid state fuse 26 transitions the power switch SW from ON to a PWM mode. When the current ripple is greater than the second current ripple threshold (such as 20%), the fuse controller 54 in the solid state fuse 26 transitions the power switch SW from ON to OFF.

Figure 9:
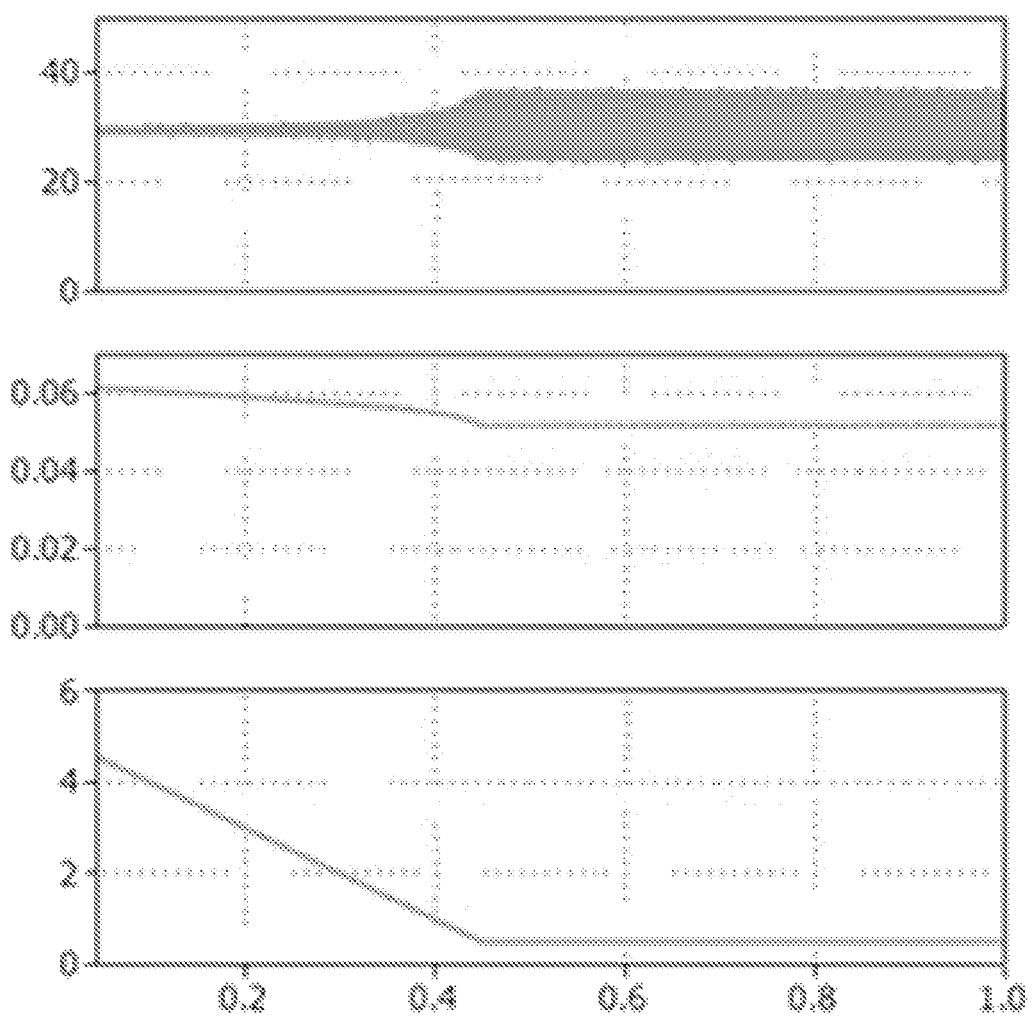
FIG. 9 include graphs illustrating an example of current, duty cycle and load during PWM control of a power switch in the solid state fuse according to the present disclosure.

Referring now to FIG. 9, current limiting can be performed at low load impedance by controlling a state of the power switch SW using PWM of the power switch SW in the solid state fuse 26. For example, low load impedance may occur due to failure of one or more switches in the power inverter, shorting of windings in the electric machine, shorts due to thinning insulation in the electric machine, bearing currents, etc.

In some examples, the fuse controller 54 is configured to identify first types of faults and second types of faults. In some examples, the first types of faults are more serious than the second types of faults. In some examples, first and second predetermined thresholds are compared to monitored and/or calculated operating parameters such as voltage, current, current ripple, voltage ripple, etc. When a lower threshold is exceeded but not a higher threshold, the fuse controller 54 declares the second type of fault. When the higher threshold is exceeded, the fuse controller 54 declares the first type of fault. In response to detecting the first type of faults, the fuse controller 54 opens the power switch SW. In response to second type of faults, the fuse controller 54 causes a pulse width modulation (PWM) signal to be output to the power switch SW.

Figure 10A:
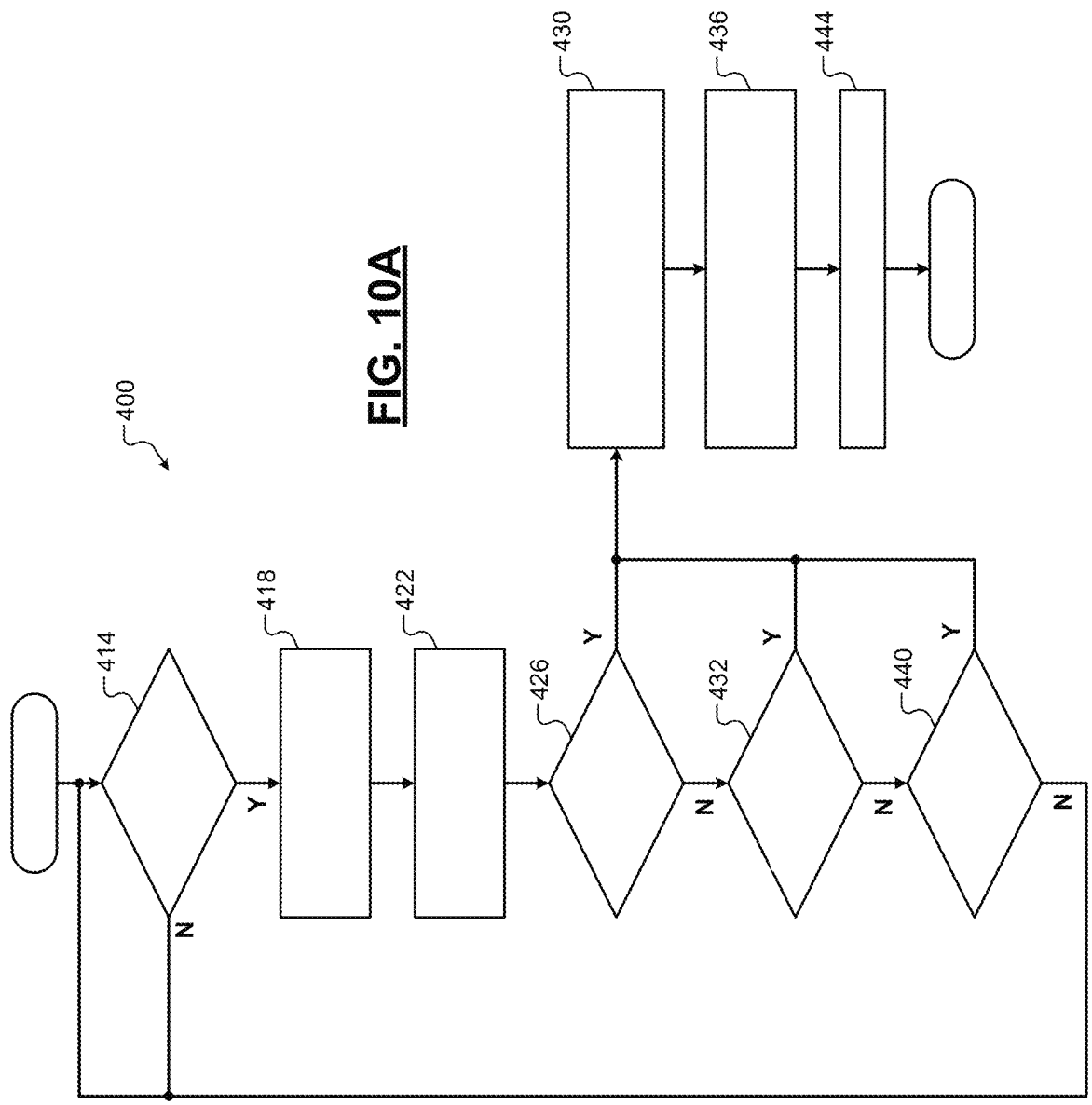

Referring now to FIGS. 10A and 10B, examples of methods for operating the solid state fuse 26 are shown. In FIG. 10A, a method 400 determines whether the vehicle is operating at 414. If 414 is true, the method continues at 418 and current, voltage and/or other operating parameters are sensed and/or calculated. In some examples, the calculated values such as ripple are generated based on the sensed values. At 422, the sensed and/or calculated values are stored. In some examples, the current and voltage values are stored in a location that is periodically over written.

At 126, the method determines whether the current is greater than a first predetermined current threshold $I_{TH}$. If 426 is true, the method continues at 430 and opens the power switch SW in the solid state fuse. In other examples, the solid state fuse initiates a pulse width modulation (PWM) mode of the power switch SW in the solid state fuse 26. At 436, the stored current and voltage values and/or calculated values are copied to another memory location to prevent them from being over written. At 444, the method sets a fault.

If 426 is false, the method continues at 432 and determines whether the current ripple is greater than a first predetermined current ripple threshold $R_{C\_TH}$. In some examples, the first predetermined current ripple threshold $R_{C\_TH}$ is set to a predetermined percentage of a desired current (e.g. 10%, 15%, 20% or another value). If 432 is true, the method continues at 430.

If 432 is false, the method continues at 440 and determines whether the voltage ripple is greater than a first predetermined voltage ripple threshold $R_{V\_TH}$. In some examples, the first predetermined voltage ripple threshold $R_{V\_TH}$ is set to a predetermined percentage of a desired load voltage (e.g. 10%, 15%, 20% or another value). If 440 is false, the method continues at 414. While the foregoing example relates to current, current ripple and voltage ripple, other operating parameters can be used.

In FIG. 10B, a method 500 uses additional thresholds to distinguish between faults requiring opening of the power switch SW in the solid state fuse 26 and faults allowing a limp home mode. At 426, the method determines whether the current is greater than a first predetermined current threshold $I_{TH1}$. If 426 is true, the method continues at 510 and determines whether the current is greater than a second predetermined current threshold $I_{TH2}$ (greater than the first predetermined current threshold $I_{TH}$). If 510 is false, the method continues at 512 and transitions the solid state fuse 26 to PWM control of the power switch SW and sets a first fault. If 510 is true, the method continues at 516 and opens the power switch SW in the solid state fuse 26 and sets a second fault. At 544, the stored current and voltage values are copied to another memory location to prevent them from being over written.

If 426 is false and 432 is true, the method continues at 520 and determines whether the current ripple is greater than a second predetermined current ripple threshold $R_{C\_TH2}$ (greater than the first predetermined current ripple threshold $R_{C\_TH}$). If 520 is false, the method continues at 522 and transitions the solid state fuse 26 to PWM control of the power switch SW and sets a third fault. If 520 is true, the method continues at 526 and opens the power switch SW in the solid state fuse 26 and sets a fourth fault. At 544, the stored current and voltage values are copied to another memory location to prevent them from being over written.

If 426 and 432 are false and 440 is true, the method continues at 530 and determines whether the load voltage ripple is greater than a second predetermined current ripple threshold $R_{V\_TH2}$ (greater than the first predetermined voltage ripple threshold $R_{V\_TH}$). If 530 is false, the method continues at 532 and transitions the solid state fuse 26 to PWM control of the power switch SW and sets a fifth fault. If 530 is true, the method continues at 536 and opens the power switch SW in the solid state fuse 26 and sets a sixth fault. At 544, the stored current and voltage values are copied to another memory location.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A power control system for an electric vehicle, comprising:
   a power inverter comprising a first side, a second side, and a plurality of power switches, wherein the second side is configured to connect to an electric machine; and
   a solid state fuse including:
      a power switch including a first terminal in communication with the first terminal of a rechargeable energy storage system (RESS) of the electric vehicle and a second terminal in communication with the first side of the power inverter;
      a DC-DC converter configured to convert a first voltage output by the RESS of the electric vehicle to a second voltage;
      one or more sensors including a voltage sensor configured to sense voltage output by the RESS; and
      a fuse controller configured to receive power from the DC-DC converter, communicate with the voltage sensor, calculate voltage ripple based on the sensed voltage, compare the voltage ripple to a predetermined voltage ripple threshold, and cause the power switch to selectively open when the voltage ripple is greater than the predetermined voltage ripple threshold.

2. The power control system of claim 1, wherein the DC-DC converter comprises an isolated DC-DC converter.

3. The power control system of claim 1, wherein:
   the one or more sensors comprises a current sensor configured to sense current output by the RESS; and
   the fuse controller is configured to compare the sensed curren to a predetermined current threshold and cause the power switch to selectively open when the sensed current is greater than the predetermined current threshold.

4. The power control system of claim 1, wherein:
the one or more sensors comprises a current sensor configured to sense current output by the RESS, and
the fuse controller is configured to calculate current ripple based on the sensed current, compare the current ripple to a predetermined current ripple threshold and cause the power switch to selectively open when the current ripple is greater than the predetermined current ripple threshold.

5. The power control system of claim 1, wherein the solid state fuse further comprises a gate driver configured to communicate with the DC-DC converter and the fuse controller and to selectively output a control signal to a control terminal of the power switch.

6. The power control system of claim 1, wherein the solid state fuse further comprises an isolator configured to provide isolation between the fuse controller and a vehicle data bus and to receive data from and send data to the vehicle data bus.

7. The power control system of claim 1, wherein the fuse controller is configured to cause a pulse width modulated signal to be output to the power switch in response to a fault.

8. The power control system of claim 1, wherein the fuse controller is configured to:
communicate with the one or more sensors;
detect a first type of faults and a second type of faults;
cause the power switch to selectively open in response to the first type of faults; and
cause a pulse width modulated (PWM) signal to be output to the power switch in response to the second type of faults.

9. The power control system of claim 1, further comprising a snubber circuit connected in parallel to the power switch.

10. A power control system for an electric vehicle, comprising:
a power inverter comprising a first side, a second side, and a plurality of power switches, wherein the second side is configured to connect an electric machine; and
a solid state fuse including:
a power switch including a first terminal in communication with a first terminal of a rechargeable energy storage system (RESS) of the electric vehicle and a second terminal in communication with the first side of the power inverter;
one or more sensors configured to sense one or more operating parameters of the RESS; and
a fuse controller configured to:
communicate with the one or more sensors;
detect a first type of faults and a second type of faults;
cause the power switch to selectively open in response to detecting the first type of faults based on the one or more operating parameters; and
cause output of a pulse width modulated (PWM) signal to the power switch in response to detecting the second type of faults.

11. The power control system of claim 10, further comprising a DC-DC converter configured to convert a first voltage output by the RESS to a second voltage, wherein the fuse controller is powered by the second voltage.

12. The power control system of claim 11, wherein the solid state fuse further comprises a gate driver configured to communicate with the DC-DC converter and the fuse controller and to selectively output a control signal to a control terminal of the power switch.

13. The power control system of claim 10, wherein:
the one or more sensors comprises a voltage sensor configured to sense voltage output by the RESS, and
the fuse controller is configured to:
calculate voltage ripple based on the sensed voltage;
compare the voltage ripple to a predetermined voltage ripple threshold; and
selectively declare one of the first type of faults and the second type of faults in response to the comparison.

14. The power control system of claim 10, wherein:
the one or more sensors comprises a current sensor configured to sense current output by the RESS; and
the fuse controller is configured to:
compare the current to a predetermined current threshold; and
selectively declare one of the first type of faults and the second type of faults in response to the comparison.

15. The power control system of claim 10, wherein:
the one or more sensors comprises a current sensor configured to sense current output by the RESS, and
the fuse controller is configured to:
calculate current ripple based on the sensed current;
compare the current ripple to a predetermined current ripple threshold; and
selectively declare one of the first type of faults and the second type of faults in response to the comparison.

16. The power control system of claim 10, wherein the solid state fuse further comprises an isolator configured to provide isolation between the fuse controller and a vehicle data bus and to receive data from and send data to the vehicle data bus.

17. The power control system of claim 10, wherein the solid state fuse further comprises a snubber circuit connected in parallel to the power switch.

18. A power control system for an electric vehicle, comprising:
a power inverter comprising a first side, a second side, and a plurality of power switches where the second side is configured for connection to an electric machine;
a solid state fuse including:
a power switch including a first terminal in communication with the first terminal of a rechargeable energy storage system (RESS) of the electric vehicle and a second terminal in communication with the first side of the power inverter;
an isolated DC-DC converter configured to convert a first voltage output by the RESS to a second voltage;
one or more sensors configured to sense one or more operating parameters of the RESS; and
a fuse controller configured to:
communicate with the one or more sensors;
receive the second voltage from the DC-DC converter;
detect a first type of faults and a second type of faults based on the one or more operating parameters;
cause the power switch to selectively open in response to the first type of faults; and
cause output of a pulse width modulated (PWM) signal to the power switch in response to the second type of faults.

19. The power control system of claim 18, wherein:
the one or more sensors comprises a voltage sensor configured to sense voltage output by the RESS, and
the fuse controller configured to calculate voltage ripple based on the sensed voltage, compare the voltage ripple to a predetermined voltage ripple threshold and cause the power switch to selectively open when the voltage ripple is greater than the predetermined voltage ripple threshold.

20. The power control system of claim 18, wherein:
the one or more sensors comprises a current sensor configured to sense current output by the RESS; and
the fuse controller is configured to:
  compare the sensed current to a predetermined current threshold and cause the power switch to selectively open when the sensed current is greater than the predetermined current threshold; or
  calculate current ripple based on the sensed current, compare the current ripple to a predetermined current ripple threshold and cause the power switch to selectively open when the current ripple is greater than the predetermined current ripple threshold.

* * * * *